United States Patent [19]

Leyderman

[11] Patent Number: 5,350,139
[45] Date of Patent: Sep. 27, 1994

[54] MANDREL FOR MAKING A RIGID TUBULAR ARTICLE

[75] Inventor: Mikhail Leyderman, Bloomington, Minn.

[73] Assignee: Minnesota Mining and Manufacturing Company, St. Paul, Minn.

[21] Appl. No.: 22,769

[22] Filed: Feb. 25, 1993

Related U.S. Application Data

[63] Continuation of Ser. No. 773,150, Oct. 8, 1991, abandoned.

[51] Int. Cl.$^5$ .......................... B28B 7/28; B28B 21/86
[52] U.S. Cl. .................... 249/177; 249/184; 425/392; 425/393; 425/403
[58] Field of Search .................. 264/29.1, 29.5, 131, 264/219, 334, 336, 279; 427/227–229; 249/57, 197, 184–186; 425/403.1, 392, 393, 403

[56] References Cited

U.S. PATENT DOCUMENTS

| | | | |
|---|---|---|---|
| 1,761,568 | 6/1930 | Kersten | 249/186 X |
| 2,181,257 | 11/1939 | Arbogast | 249/184 X |
| 3,095,613 | 7/1963 | Christensen et al. | 249/145 |
| 3,417,601 | 12/1968 | Werner | 72/467 |
| 3,462,289 | 8/1969 | Rohl et al. | 427/228 |
| 3,545,718 | 12/1970 | Shale | 425/468 X |
| 3,672,936 | 6/1972 | Ehrenreich . | |
| 3,752,436 | 8/1973 | Deutsch | 249/145 |
| 3,752,438 | 8/1973 | Baillie | 249/184 |
| 4,298,330 | 11/1981 | Davis | 425/392 |
| 4,436,690 | 3/1984 | Davis | 264/313 |
| 4,484,724 | 11/1984 | Srackangast | 249/145 X |
| 4,721,280 | 1/1988 | Barainsky | 249/185 |
| 4,818,448 | 4/1989 | Wrenn, Jr. et al. | 264/86 X |
| 4,950,606 | 8/1990 | Stirling et al. | 435/280 |
| 4,980,202 | 12/1990 | Brennan et al. | 427/249 |
| 5,024,979 | 6/1991 | Debaig-Valade et al. | 427/228 X |
| 5,039,345 | 8/1991 | Mott | 106/711 |

FOREIGN PATENT DOCUMENTS

| | | | |
|---|---|---|---|
| 41123 | 12/1981 | European Pat. Off. | 249/184 |
| 2238625 | 2/1974 | Fed. Rep. of Germany . | |
| 533139 | 2/1922 | France | 249/184 |
| 2064688 | 7/1971 | France . | |
| 2150269 | 6/1973 | France . | |
| 2510941 | 11/1983 | France . | |
| 264834 | 10/1989 | Japan . | |
| 1264834 | 10/1989 | Japan | 425/392 |
| WO85/04604 | 10/1985 | PCT Int'l Appl. . | |

OTHER PUBLICATIONS

The Kanthal Corporation, "Kanthal Extruded Radiant and Protection Tubes", product literature.
Templeman Industries, Inc., "Mandrel Fabrication", product literature.
3M Company, "SICONEX Fiber-Reinforced Ceramic", product literature.
U.S. Application Ser. No. 07/747,647 entitled "High Temperature Ceramic Composite" filed Aug. 20, 1991.

*Primary Examiner*—Karen Aftergut
*Attorney, Agent, or Firm*—Gary L. Griswold; Walter N. Kirn; Karl G. Hanson

[57] ABSTRACT

A mandrel for making a rigid tubular article that has integrally-formed straight and arcuate portions. The mandrel has a plurality of shape-providing elements slidably disposed on interconnected straight and arcuate rods. After a rigid tubular article has been formed about the mandrel, the shape-providing elements can be slid off the straight and arcuate rods so that the mandrel can be removed from the rigid tubular article's interior. This provides for easy separation of the mandrel from the tubular article.

7 Claims, 3 Drawing Sheets

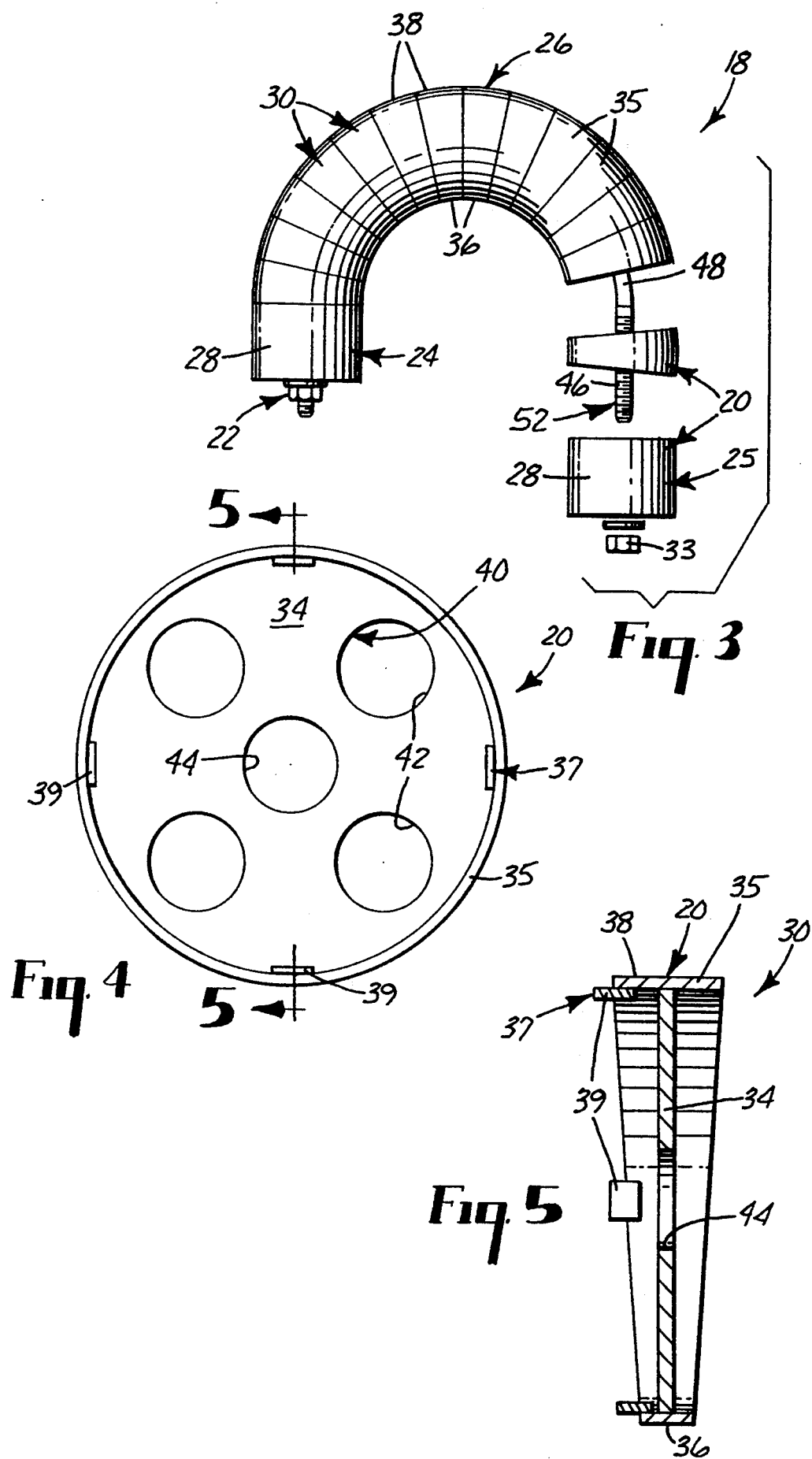

MANDREL FOR MAKING A RIGID TUBULAR ARTICLE

This is a continuation of application Ser. No. 07/773,150 filed Oct. 8, 1991, now abandoned.

TECHNICAL FIELD

This invention pertains to a mandrel and a method for forming a rigid, tubular article that has a straight portion and an arcuate portion. This invention also pertains to a composite ceramic tubular article having straight and arcuate portions integrally formed with respect to each other.

BACKGROUND OF THE INVENTION

Mandrels have been used to make rigid tubular articles. The rigid tubular articles have been made by placing the material that will form the tubular article about the mandrel, and hardening that material to a rigid state. After the tubular article becomes rigid, the mandrel is removed from the interior of the tubular article.

Removal can be accomplished by sliding the mandrel out from the interior of the tubular article. This method works well when the tubular article does not have a complex shape. For instance, if the tubular article is straight, or if it is arcuate with a constant bend radius, the mandrel can be slid out from the interior of the tubular article.

A conventional mandrel comes in one piece, and has an outer shape that corresponds to the shape of the interior of the tubular article. It has been problematic to use a single conventional mandrel to form a rigid tubular article that has both a straight portion and an arcuate portion. When the rigid tubular article has such a shape, it is difficult to separate the rigid tubular article from the mandrel. The combination of the straight and arcuate portions prevents the mandrel from being slid out of the interior of the rigid tubular article. Rigid tubular articles having straight and arcuate portions therefore cannot be formed from a single conventional mandrel.

To make a tubular article having a straight portion and an arcuate portion from a conventional mandrel, the article can be made by using more than one mandrel: one mandrel is used to form the straight portion; and another is used to form the arcuate portion. The individual tubular segments formed from each of the separate mandrels are subsequently connected to each other to produce the desired tubular article.

Rigid tubular articles having straight and arcuate portions can be made from "wash-away" mandrels. In this instance, the mandrel can be remove from the interior of the rigid tubular article by dissolving the mandrel with steam. Templemen Industries, Inc. of North Chicago, Ill. markets such a mandrel. "Wash-away" mandrels, however, are disadvantageous in that the mandrel is not reusable, and it leaves a dissolved by-product that must be disposed of in an environmentally sound manner.

SUMMARY OF THE INVENTION

The new mandrel of this invention provides for the formation of a rigid tubular article having a straight portion and an arcuate portion. The mandrel comprises a plurality of shape-providing elements and a means for retaining the shape-providing elements, the shape-providing elements include a straight portion and an arcuate portion, which portions are disposed on the means for retaining the shape-providing elements; and wherein the straight and arcuate portions of the mandrel are disposed on the means for retaining the shape-providing elements such that at least one of the straight and arcuate portions of the mandrel can be slidably removed from the means for retaining the shape-providing elements when the rigid, tubular article has been formed about the straight and arcuate portions of the mandrel.

The new method of this invention comprises:
(a) forming a rigid tubular article having a straight portion and an arcuate portion on a mandrel; and
(b) removing the mandrel from the interior of the rigid tubular article by the steps comprising:
  (i) sliding a plurality of shape-providing elements of the mandrel from the rigid tubular article having arcuate and straight portions, the mandrel's shape-providing elements being slid off separatively from a means for retaining the shape-providing elements; and
  (ii) removing the means for retaining the shape-providing elements from the interior of the rigid tubular article having the straight and arcuate portions.

This invention overcomes the above-noted problem of separating a mandrel from a rigid tubular article having a straight portion and an arcuate portion. The new mandrel and new method of this invention provide easy removal of the mandrel from the tubular article without having to destroy the mandrel to remove it. This provides for reuse of the mandrel, and allows a tubular article to be made that has the straight and arcuate portions integrally formed with respect to each other. There is no longer a need to destroy the mandrel to effect its removal; nor do the straight and arcuate tubular portions need to be made separately and then be combined into a final tubular article.

The above novel features, advantages, and other aspects of the invention are more fully shown and described in the drawings and detailed description of the invention, where like reference numerals are used to designate similar parts. It is to be expressly understood, however, that the drawings and description are for the purposes of illustration only; they should not be read in a manner that would unduly limit the scope of this invention.

BRIEF DESCRIPTION OF THE FIGURES

FIG. 3 is a top view of a mandrel in accordance with the present invention.

FIG. 4 is an end view of a wedge-shaped mandrel segment in accordance with the present invention.

FIG. 5 is a cross-sectional view of the mandrel segment of FIG. 4 taken along lines 5—5.

DETAILED DESCRIPTION OF PREFERRED EMBODIMENTS OF THE INVENTION

In describing the preferred embodiments of this invention, specific terminology will be used for the sake of clarity. It is to be understood, however, that each specific term so selected includes all of the technical equivalents that operate similarly.

Figure 1:
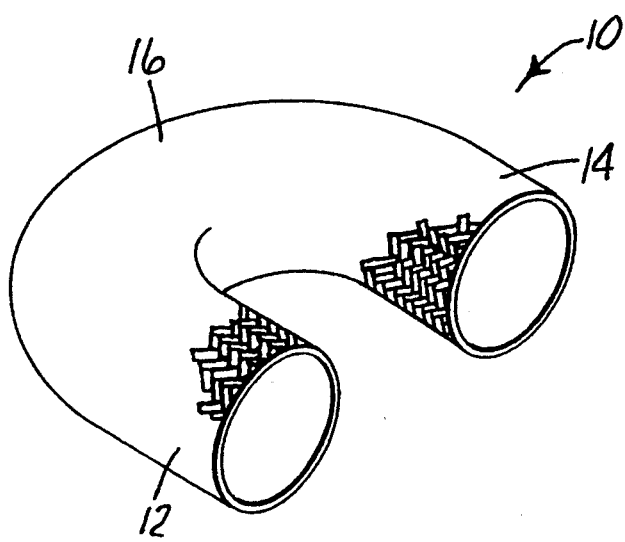
FIG. 1 is a perspective view of a rigid composite ceramic article in accordance with the present invention.

In the practice of the present invention, a tubular article can be made which has integrally-formed straight and arcuate portions. In FIG. 1 an example of such a tubular article is shown. Tubular article 10 has a first straight portion 12, a second straight portion 14, and an arcuate portion 16. Arcuate portion 16 is located between the first and second straight portions 12 and 14, and is integral therewith. That is, the tubular article is made from one piece—rather than being made from three separate parts that are subsequently pieced together.

Figure 2:
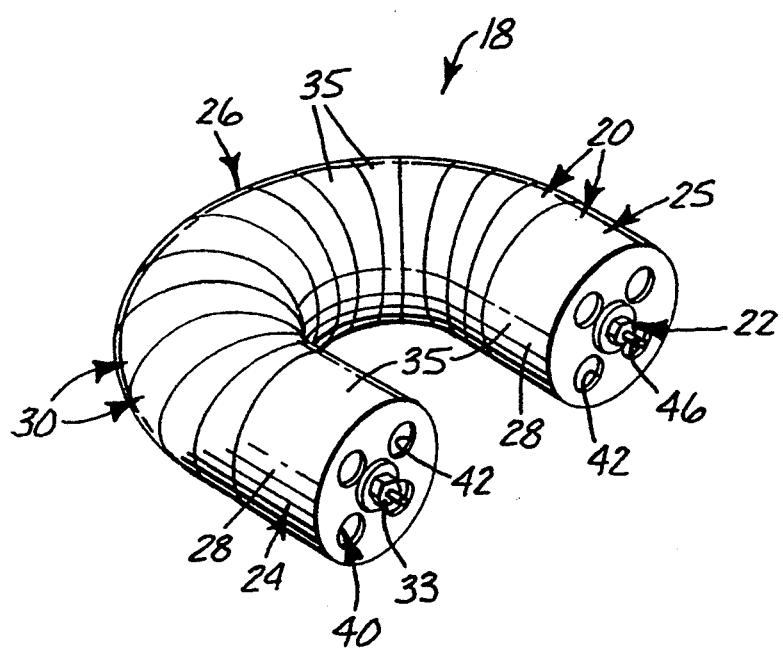
FIG. 2 is a perspective view of a mandrel in accordance with the present invention.

Tubular article 10 can be made on mandrel 18 shown in FIG. 2. Mandrel 18 has a plurality of shape-providing elements 20 and means 22 for retaining the shape-providing elements. Shape-providing elements 20 include straight portions 24, 25, and arcuate portion 26. As the term is used here, "arcuate" means having a bend, not necessarily a bend with a constant radius.

Figure 6:
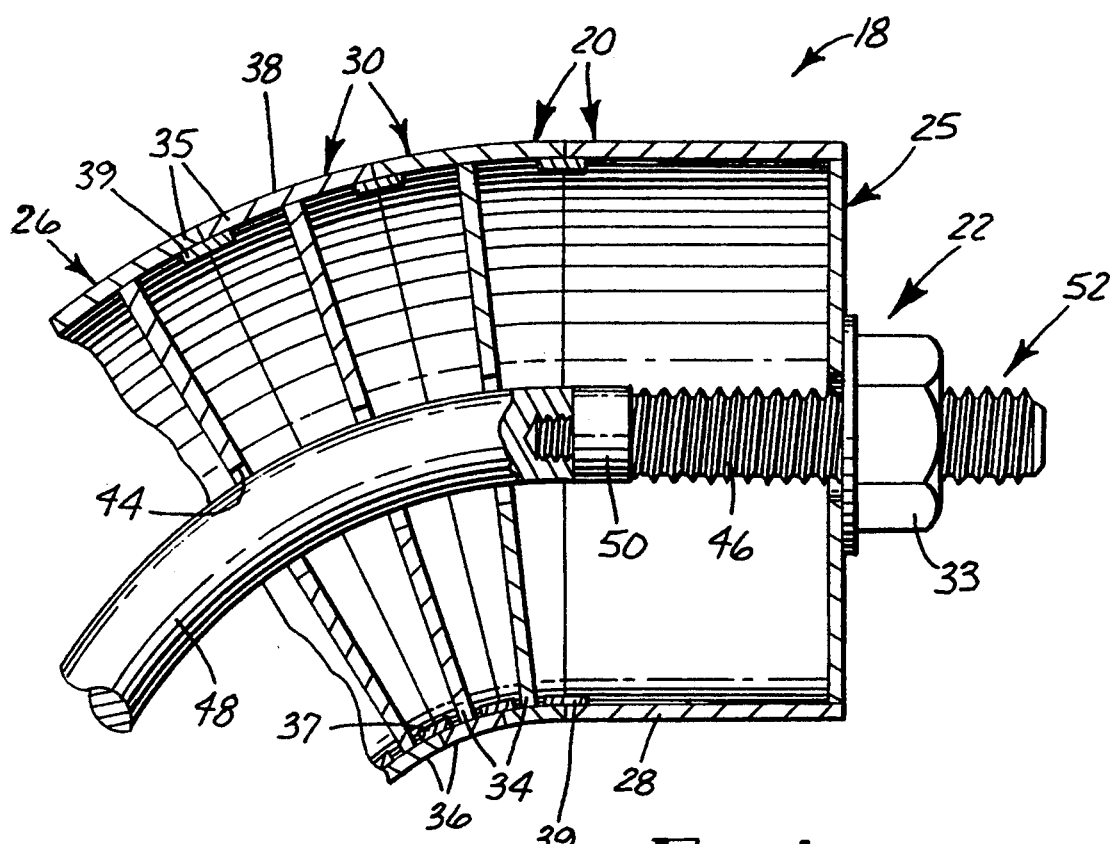
FIG. 6 is a cross-sectional view of a portion of a mandrel in accordance with the present invention.

As illustrated in FIGS. 2, 3, and 6, straight portions 24 and 25 and arcuate portion 26 are disposed on retaining means 22. The straight and arcuate portions 24, 25, and 26 are disposed on the retaining means in a manner that allows those portions to be slidably removed from the retaining means 22.

Retaining means 22 can comprise a plurality of connectable members. As best shown in FIGS. 3 and 6, the connectable members preferably include a plurality of straight and arcuate rods 46 and 48, respectively. The straight and arcuate rods 46 and 48 have the ability to be connected to and separated from each other at adjacent ends 50. This can be accomplished, for example, by providing mating threads on the straight and arcuate rods 46 and 48, respectively. On the rods that define the terminal ends of the mandrel, there can be threads 52 for receiving nut 33.

Each straight portion 24, 25 of mandrel 18 has at least one straight segment 28. Arcuate portion 26 of mandrel 18 includes a plurality of separative segments, preferably separative wedge-shaped segments 30. As the term is used here, "separative" means the segments are not physically connected. Nut 33 can be employed to secure the straight and wedge-shaped segments 28 and 30 to the retaining means 22.

The number of separative segments used in straight portions 24 and 25 and arcuate portion 26 is a matter of choice. The inventor has found that there is generally a correlation between the number of segments employed and ease of removal. That is, the more segments that are employed, the easier it is to remove each segment from the rigid tubular article, particularly along the arcuate portion. An increase in the number of segments on the arcuate portion of the mandrel will also provide a more accurate curve for a rigid tubular article formed therabout. To provide a U-shaped tubular article having an arcuate portion with a 180° bend and a circular cross-section with a 4.5 inch (11.4 cm) inner diameter, the inventor has found that such an article can be suitably made from a mandrel having 14 wedge-shaped segments 30 along arcuate portion 26 and one straight segment 28 on each straight portion 24, 25 of U-shaped mandrel 18.

Wedge-shaped segments 30 are shown in cross section in FIG. 5. As shown in that figure, wedge-shaped segment 30 includes web 34 and shell 35 disposed perpendicular to web 34. Web 34 centrally intersects with shell 35. Shell 35 extends laterally from web 34 and increases in cross-sectional area from side 36 (defines the inner bend of arcuate portion 16) to side 38 (defines the outer bend of arcuate portion 26). A means 37 for aligning adjacent segments can be employed on each mandrel segment. Such a means can take the form of a tab 39 projecting laterally from shell 35.

To facilitate assembly and disassembly of mandrel 18, a means 40 for gripping each segment can be provided. As best shown in FIGS. 2 and 4, gripping means 40 can, for example, take the form of openings 42 on web 34. Openings 42, preferably, are sized to permit a person's fingers or a tool to pass therethrough so that the straight or wedge-shaped segment can be gripped and slid off of the retaining means 22.

A central opening 44 is disposed on each mandrel segment to accommodate retaining means 22. As shown in FIG. 4, central opening 44 can be a circular opening, corresponding to the cross-sectional shape of rods 46 and 48. To facilitate removal of the mandrel segments from retaining means 22, central opening 44 can be oblong in shape. Preferably, opening 44 is sized to provide some play between the mandrel segments and rods 46 and 48 to make the segments easier to remove.

The shape providing elements of the mandrel are preferably fabricated from aluminum. Aluminum has thermal expansion coefficients that allows the mandrel's shape-providing elements to be more easily removed from a tubular article that has been subjected to heating and cooling during formation of the article.

In the method of this invention, rigid tubular articles can be made which have integrally-formed straight and arcuate portions. The method comprises two steps: forming the rigid tubular article on a mandrel; and removing the mandrel from the interior of the tubular article. The first step is accomplished by providing a mandrel, and molding the tubular article about the mandrel. A mandrel can be provided by assembling a retaining means, and securing a plurality of shape-providing elements to the retaining means. The retaining means can be assembled by connecting a plurality of engagable members, such as, engagable straight and arcuate rods 46 and 48. Shape-providing elements can be secured to the retaining means by sliding the shape-providing elements onto the retaining means and fixing the former to the latter using any suitable means, for example a threaded nut 33.

The tubular article can be molded about the assembled mandrel by placing a hardenable material over the surface of the mandrel. After the hardenable material has hardened or become rigid, a tubular article has been formed that has integral straight and arcuate portions. It is then necessary to remove the mandrel from the tubular article.

A mandrel can be removed from an interior of a tubular article by sliding the plurality of shape-providing elements 20 from the retaining means 22. The mandrel's shape-providing elements are slid off separatively from the retaining means 22 as shown in FIG. 3.

Retaining means 22 can be removed from the interior of the tubular article by disassembling the interconnected straight and arcuate parts. This can be accomplished, for example, when straight and arcuate rods 46 and 48 are used, by unscrewing one rod from the other. As shown in FIG. 6, adjacent ends 50 of rods 46 and 48 can be threaded together.

In the method of this invention, it is not necessary that all of the shape-providing elements be slidably removed from the retaining means. For example, if a J-shaped article is to be made where the arcuate portion has a constant bent radius, the mandrel can be separated from the rigid tubular article by sliding either of the following from the retaining means: (1) the shape providing elements of the straight portion; or (2) the shape providing elements of the arcuate portion. The straight or arcuate portion that is not slidably removed from the retaining means element by element can be removed from the interior of the tubular article as a whole.

Using the mandrel and/or method of this invention, a variety of tubular articles can be formed having an indefinite number of shapes. For example, U-shaped, serpentine-shaped, and spiral-shaped tubular articles can be formed. The tubular articles made by this invention may have a constant circumference area as shown in FIG. 1, or a varying circumference, such as a horn-shaped article. The invention therefore is not to be limited to a particular tubular article disclosed herein, but will include all tubular articles that permit the mandrel's shape-providing elements to be slidably removed from the interior of the tubular article.

When the tubular article to be formed has a relatively very short straight or arcuate portion, it may be possible to use a single conventional mandrel to form the tubular article. In such an instance, the conventional mandrel and the tubular article may be separatable; however, there is still a possibility that the tubular article can be damaged during the separation. The protruding edge of the mandrel's short portion can distort or gouge the interior of the tubular article as the mandrel is slid therefrom. This invention therefore does not include the formation of tubular articles that can otherwise be suitably made from a single conventional mandrel, and the use of "straight portion" and "arcuate portion" herein only refers to those portions of the tubular article and mandrel which have lengths that are structurally or mechanically significant to this invention.

The mandrel and method of this invention are envisioned as being useful for making fibrous composite tubular articles. For example, tubular articles can be made from ceramic fibers, fiberglass, carbon fibers, polyamide fibers and the like. The fibers are overcoated with a hardenable material such as a resin, adhesive, or cement. Although the mandrel and method of this invention are useful for making fibrous composite articles, it is within the scope of this invention to use a hardenable material by itself without fiber reinforcement. Any hardenable material can be employed which forms a rigid tubular article that can be separated from the mandrel by the method of this invention.

A particular fibrous composite tubular article that can be made by the mandrel and method of this invention has integrally-formed straight and arcuate portions and comprises a layer of ceramic fibers, a first coating of a carbonaceous matrix, and a second coating of silicon carbide. A composite ceramic tubular article comprising these elements can be used at temperatures up to about 1250° C. in high temperature, corrosive environments, for example, in industrial heating furnaces and aluminum melting furnaces. U.S. patent application Ser. No. 07/747,647 entitled "High Temperature Composite Ceramic" filed Aug. 20, 1991 discloses composite ceramic articles and their use in such environments. The disclosure of that application is incorporated here by reference.

The composite ceramic tubular articles that can be made by the mandrel and method of this invention comprises ceramic oxide fibers, a first coating at least partially covering the ceramic oxide fibers, and a second coating at least partially covering the first coating. The first coating comprises a carbonaceous matrix. The second coating comprises silicon carbide. Additionally, boron nitride particles can be placed in contact with the carbonaceous matrix (preferably embedded therein) as disclosed in U.S. patent application Ser. No. 07/747,647 entitled "High Temperature Ceramic Composite" filed Aug. 20, 1991. The boron nitride particles have a particle size of about 0.5 to 30 micrometers and are incorporated into a precursor of the carbonaceous matrix at about 0.2 to 15 weight percent based on the total weight of the composite tubular article.

As the term is used here, "carbonaceous" means that substantially all of the carbon present in the ceramic article is amorphous. The carbonaceous matrix in regard to an individual fiber typically has a thickness in the range from greater than zero to about 1 micrometer. Preferably, the carbonaceous matrix has a thickness in the range from greater than zero to about 50 nanometers. The minimum thickness is that which is needed to provide a rigidified article suitable to make the tubular ceramic article of this invention. Thicknesses greater than about 1 micrometer can be useful; however, there is no significant improvement to the tubular article, and such thickness may not be economical.

A certain portion of the exposed surface area of the ceramic oxide fibers is available for coating. The term "available surface area for coating" refers to that portion of the exposed surface area of the fibers that is available for coating. For example, the surface area of a fiber which would be unavailable for coating includes that which, because of braiding, weaving, knitting, or winding the configuration of the fibers, is in contact with itself or with other fibers.

A certain portion of the exposed surface area of the ceramic oxide fibers having the first coating thereon is available for overcoating. The term "available surface for overcoating" refers to that portion of the exposed surface of the ceramic oxide fibers having the first coating thereon available for overcoating (that is, the sum of the exposed surface area of the first coating available for overcoating and the remaining exposed surface area of the ceramic oxide fibers which was available for coating, but was not covered by the first coating).

Generally, the first coating covers at least about 1 percent of the surface available for coating, and the second coating will cover at least about 50 percent of the surface available for overcoating.

Preferably, the first coating covers at least 90 percent of the surface available for coating, and the second coating covers at least about 90 percent of the surface available for overcoating. More preferably, the first coating covers about 100 percent of the surface available for coating and the second coating covers about 100 percent of the surface available for overcoating.

Preferably, the ceramic oxide fibers are present in the range from about 20 to about 50 percent by weight (more preferably 25 to 35 percent), the carbonaceous matrix is present in the range from about 0.2 to about 20 percent by weight (more preferably 0.5 to 6 percent), and the silicon carbide is present in the range from about 50 to 75 percent by weight (more preferably 60 to 75 percent), based on the total weight of the composite article.

The composite tubular article preferably comprises a plurality of ceramic oxide fibers such as, for example, a yarn comprising a plurality of individual ceramic oxide fibers. Examples of ceramic oxide fibers include alumina fibers, aluminosilicate fibers, and aluminoborosilicate fibers. Aluminoborosilicate fibers are preferred over the other fibers. Mixtures or combinations of these fibers may be used to form a rigid tubular article. Preferred ceramic oxide fibers are polycrystalline or amorphous and polycrystalline.

Alumina, aluminosilicate, and borosilicate fibers are known in the art. Alumina fibers are disclosed in U.S. Pat. No. 4,954,462 to Wood et al. Aluminosilicate fibers are disclosed in U.S. Pat. No. 4,047,965 to Karst et al. Preferred aluminosilicate fibers have an alumina content in the range from about 67 to 77 percent by weight and a silica content in the range from about 33 to about 23 percent by weight, based on the total oxide content of the fiber. Aluminoborosilicate fibers are disclosed in U.S. Pat. No. 3,795,524 to Sowman. Suitable aluminoborosilicate fibers preferably have an alumina to boria mole ratio in the range from about 9:2 to about 3:1.5, and a silica content in the range from greater than zero to about 65 percent by weight, based on the total oxide content of the fiber. The disclosures of U.S. Pat. Nos. 4,954,462, 4,047,965, and 3,795,524 are incorporated here by reference.

The ceramic oxide fibers preferably have a diameter in the range from about 1 to about 50 micrometers. More preferably, the fibers have a diameter in the range from about 10 to about 25 micrometers. The cross-section of the fibers may be circular or elliptical.

Typically, individual ceramic oxide fibers are grouped together to form a yarn. Generally, the ceramic oxide yarn has a diameter in the range from about 0.2 mm to about 1.5 ram. Such yarns typically comprise in the range from about 780 to about 7800 individual ceramic oxide fibers. Preferably, the yarn comprises in the range from about 1560 to about 4680 individual fibers. Preferably, the ceramic oxide yarn is ply-twisted because such a construction has better strength than a yarn which is not ply-twisted.

Suitable alumina yarns are commercially available from 3M Company of St. Paul, Minn., and are sold under the trademark NEXTEL 610 CERAMIC FIBERS. Commercially available aluminoborosilicate yarns are available from 3M and include those marketed under the trademarks NEXTEL 312 CERAMIC FIBERS and NEXTEL 440 CERAMIC FIBERS.

The organic resin can be any suitable organic-based resin which is compatible with the method of this invention and is capable of being carbonized. Preferably, the organic resin is a phenolic resin. "Phenolic resin" is a term that describes a wide variety of resin products that result from the reaction product of phenols with aldehydes. Phenolic resins include, for example, acid catalyzed phenolic resins and base catalyzed phenolic resins. Phenolic resins are commercially available for example, under the trade designations DURITE-SC-1008 from Borden Chemical of Columbus, Ohio, and BKUA-2370-UCAR (a water-based phenolic resin solution) from Union Carbide of Danbury, Conn.

The organic resin can be coated onto the fibers using conventional coating techniques including brush coating, pour coating, dip coating, roll coating, spray coating, etc.

In order to more easily coat the fibers with the organic resin, the viscosity of the resin is usually lowered by adding an organic solvent such as, for example, acetone or methanol, to the resin, or by adding water to a water-based phenolic resin solution.

The organic resin is preferably dried (solvents removed) prior to curing. The organic resin can be dried using techniques known in the art including air drying, heating, etc. After the organic resin has dried, the mandrel can be removed from the interior of the tubular article. Removal can be accomplished by the steps described above. Preferably, removal would occur after curing the organic resin. The organic resin can be cured using conventional techniques, including heating.

Before carbonizing the organic resin, it is preferred that the mandrel be removed from the interior of the tubular article. The cured organic resin is carbonized using conventional techniques including, for example, heating the rigidified article in an evacuated chamber at a temperature and for a time sufficient to carbonize the cured organic resin. Heating can be, for example, by resistive heating or induction heating. An appropriate carbonizing atmosphere is a non-oxidizing atmosphere. Such an atmosphere can be provided, for example, by evacuating a furnace chamber, by flowing a non-oxidizing gas (e.g., a reducing gas, such as $H_2$; a neutral gas, such as $N_2$; or a combination thereof) through a partially evacuated furnace chamber, or by blowing a non-oxidizing gas through an unevacuated (i.e., a furnace atmosphere at atmospheric pressure or at a pressure in excess of atmospheric pressure) furnace chamber.

Typically, the cured resin is carbonized by heating it under a pressure in the range from about 5 to about 200 torr (preferably, in the range from about 5 to about 100 torr) at a temperature in the range from about 200° to about 1000° C. (preferably, in the range from about 250° to 500° C.) for about 10 minutes to about 2 hours.

Preferably, the rigidified article is heated according to the following schedule:
room temperature to about 250° C. at about 5° to about 35° C./minute (more preferably at about 5° to about 15° C./minute);
250° to about 450° C. at about 5° to about 15° C./minute (more preferably at about 5° to about 10° C./minute); and
450° to about 1,000° C. at about 5° to about 35° C./minute (more preferably at about 20° to about 35° C./minute).

The preferred gas flow rate depends on the size of the furnace chamber. For example, the preferred gas flow rate for a furnace chamber having a 59 cm (22 inches) long, 61 cm (24 inches) wide diameter quartz tube is in the range from about 6 to about 12 liters per minute.

The carbonized resin can be overcoated with silicon carbide, for example, by chemical vapor deposition. Such coating methods are known in the art and include, for example, the method disclosed in U.S. Pat. No. 4,980,202 to Brennen et al., the disclosure of which is incorporated here by reference.

Suitable commercially available silicon carbide precursors include, for example, dimethyldichlorosilane also known as "DDS," and methyltrichlorosilane also known as "MTS."

Typically, the rigidified, tubular article comprising ceramic oxide fibers, and cured organic resin, is placed in a chemical vapor deposition chamber (for example, a quartz chamber), which is then evacuated. While flowing a reducing or inert gas through the evacuated chamber, the furnace is heated (for example, resistively or inductively) to the desired carbonization temperature. Silicon carbide is then coated over the at least partially carbonized organic resin by inducing a silicon precursor into the chamber. Typically, a silicon carbide precursor is introduced in the chamber by bubbling a non-oxidizing gas through a suitable silicon carbide precursor or by independently introducing a gaseous silicon carbide precursor into the chamber through a separate gas line, and the chamber is evacuated to a pressure in the range from about 5 to about 50 tort. The preferred flow rates of the silicon carbide precursor and non-oxidizing gas are dependent on the size of the furnace chamber. For example, the preferred flow rates for a 59 cm (22 inches) long, 61 cm (24 inches) wide diameter quartz tube is in the range from about 0.15 to about 20 liters per minute for the non-oxidizing gas and from about 6 to about 12 liters per minute for the silicon carbide precursor.

The time required to obtain a ceramic composite article having 50 to about 75 weight percent silicon carbide ranges from about 4 to about 30 hours or longer, depending on the size of the tubular article. The deposition temperature preferably ranges from about 900° to about 1000° C., respectively.

A composite article having about 50 weight percent silicon carbide typically has better strength and toughness than a composite article having less than about 50 weight percent silicon carbide. Although the strength of the composite article improves with increasing amounts of silicon carbide, such increase in strength relative to increased processing cost generally is not economically justified.

Figure 7:
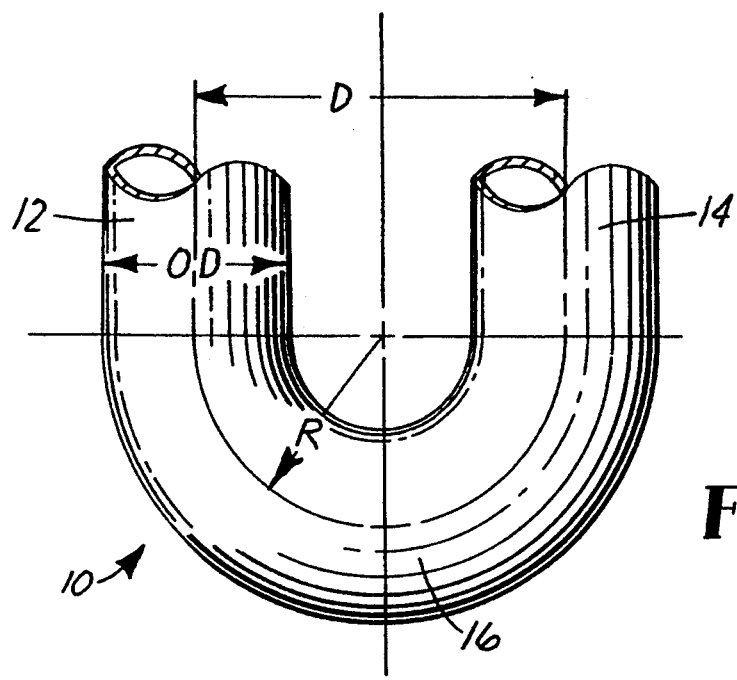
FIG. 7 is a plan view of a tubular article in accordance with the present invention.

This invention is advantageous in that it allows an arcuate composite ceramic tubular article to be made which has a relatively tight bend. Using the mandrel of this invention, a composite ceramic tubular article can be made which, as shown in FIG. 7, has a bend radius R which is the same as the tubular article's outer diameter O.D. When the composite ceramic tubular article is U-shaped as shown in FIG. 1, the straight portions 24 and 25 can be separated by a distance as small as two times the tube's O.D. The diameter D of the bend therefore is only 2×O.D.

It has been difficult to make U-shaped radiant burner tubes that have a radius R which approaches the outer diameter of the tube. For example, a metallic U-shaped radiant burner tube made by Kanthal Corporation of Bethel, Conn. has a minimum radius $R_{min}$ of 1.6 times the outer diameter O.D. The minimum distance between the straight portions of a KANTHAL U-shaped tube is 3.2 times the outer diameter O.D. In comparison, the present invention can have the straight portions separated by a distance of only 2 times the O.D. The present invention therefore allows tighter turns to be made so that the tube takes up less space.

Objects, features, and advantages of this invention are further illustrated in the following example. It should be understood, however, that the particular ingredients and amounts recited in the example, as well as other conditions and details, are not to be construed in a manner that would unduly limit the scope of this invention.

EXAMPLE

A mandrel (like the one shown in FIG. 2) was fabricated from aluminum. The fabricated mandrel had an outer diameter of 11.4 cm (4.5 inches). The mandrel was assembled, and a five inch diameter sleeve of braided ceramic oxide fibers was placed on the mandrel. The sleeve was made to order by Intec Products, Inc., Anaheim, Calif. The sleeve's specifications were NEXTEL 312 yarn, 900 denier, 12.7 cm (5 inch) inner diameter sleeve, 144 carriers, 8 ends, and 2.16 pics per cm (5.5 pics per inch). The sleeve was smoothed and shaped as necessary to fit the mandrel. The ends were trimmed of excess sleeve.

The ceramic fabric sleeve was rigidified by applying a diluted solution of a water-based phenolic resin (BKUA-2370-UCAR, from Union Carbide, Danbury, Conn.). The water-based phenolic resin (200 mL) was diluted by adding the as-received-water-based-solution to methanol in a ratio of 1:5. This diluted solution was poured onto the sleeve while continually rotating the mandrel to assure uniform coverage. The tube was dried in air for about 40 minutes to one hour until solvent odor could no longer be detected. Then the tube was cured in an oven at 210° C. for an hour. This produced a rigid composite ceramic tube having a golden color.

After the resin layer was cured, the mandrel was removed by sliding the mandrel's shape providing elements out from the interior of composite ceramic tubular article. The tube was then coated with silicon carbide by the Delta G Corporation, Sun Valley, Calif.

Various modifications and alterations of this invention will become apparent to those skilled in the art without departing from the scope and spirit of this invention. It therefore should be understood that the scope of this invention is not to be limited to the illustrative embodiments set forth herein, but is to be determined by the limitations set forth in the claims and equivalents thereof. It is to be further understood that this invention may be suitably practiced in the absence of any element that is not disclosed herein.

What is claimed is:

1. A mandrel useful for forming a rigid, tubular ceramic composite article that has a straight portion and an arcuate portion, which mandrel comprises:
   (a) a plurality of shape-providing elements that:
      (i) define a straight portion and an arcuate portion of the mandrel; and
      (ii) include first and second terminal shape-providing elements; and
   (b) a means for retaining the shape-providing elements in an aligned position the retaining means consisting essentially of:
      (i) at least one member that is straight and arcuate to pass through the shape-providing elements of the straight portion and arcuate portion of the mandrel, respectively; and
      (ii) first and second fasteners disposed immediately adjacent to the first and second terminal shape-providing elements;
   wherein the straight and arcuate portions of the mandrel are disposed on the at least one member that passes through the straight and arcuate portions of the mandrel such that after removing one or more of the first and second fasteners all of the shape-providing elements of the straight and arcuate portions of the mandrel are slidably and separately removable from the at least one member when the rigid, tubular article has been formed about the straight and arcuate portions of the mandrel.

2. The mandrel of claim 1, wherein the at least one member includes a straight rod and an arcuate rod, the straight and arcuate rods have an ability to be connected to and separated from each other at adjacent ends of the straight and arcuate rods.

3. The mandrel of claim 1, wherein the straight portion of the mandrel includes at least one straight segment, and the arcuate portion of the mandrel includes a plurality of wedge-shaped segments, the at least one straight segment and each wedge-shaped segment being separatively disposed on the at least one member.

4. The mandrel of claim 3, wherein the wedge-shaped segments each have a gripping means that allows the wedge-shaped segment to be gripped to facilitate removal of the wedge-shaped segment.

5. The mandrel of claim 4, wherein the gripping means includes a plurality of openings sized to permit a person's fingers or a tool to pass therethrough.

6. The mandrel of claim 3, wherein the wedge-shaped segments have a means for aligning a wedge-shaped segment to an adjacent wedge-shaped segment or to an adjacent straight segment so that adjacent outer shells of the wedge-shaped segments are coextensive.

7. The mandrel of claim 1, wherein the mandrel is U-shaped and has first and second straight portions, the arcuate portion of the mandrel is located between the first and second straight portions, the first and second straight portions each have at least one straight segment, the arcuate portion has a plurality of wedge-shaped segments, and the straight segments and the wedge-shaped segments are slidably disposed on the means for retaining the shape-providing elements.

* * * * *

UNITED STATES PATENT AND TRADEMARK OFFICE
CERTIFICATE OF CORRECTION

PATENT NO. : 5,350,139
DATED : September 27, 1994
INVENTOR(S) : Mikhail Leyderman It is certified that error appears in the above-indentified patent and that said Letters Patent is hereby corrected as shown below:

Col. 1, line 52, "remove" should be --removed--.

Col. 4, line 2, "16" should be --26--.

Col. 7, line 33, "ram" should be --mm--.

Col. 9, line 6, "tort" should be --torr--.

Col. 10, line 41, insert a comma after "position".

Signed and Sealed this

Twenty-eight Day of February, 1995

Attest:

BRUCE LEHMAN

Attesting Officer   Commissioner of Patents and Trademarks